3,226,320
METHOD FOR ABATING STREAM POLLUTION
Walter C. Meuly, New Brunswick, and Abraham Seldner, Princeton, N.J., assignors to Rhodia, Inc., a corporation of New York
No Drawing. Filed Apr. 22, 1963, Ser. No. 274,822
11 Claims. (Cl. 210—63)

The present invention relates to methods for abating the pollution of fluid streams polluted by at least one of hydrogen sulfide and mercaptans.

It is an object of the present invention to provide methods for abating malodors and for reducing health hazards, vegetation and wild life destruction and other pollution nuisances caused by the hydrogen sulfide and/or mercaptans present in fluid streams passing through or leaving various industrial processes such as Kraft paper making and petroleum refining and the like.

Another object of the present invention is the provision of methods for abating the pollution of fluid streams, which require no special treatment equipment.

Finally, it is an object of the present invention to provide methods for abating the pollution of fluid streams, which will be relatively simple, safe, dependable and inexpensive to practice.

Other objects and advantages of the present invention will become apparent as the description of the invention proceeds.

Briefly stated, the present invention comprises the discovery that the pollution of fluid streams polluted with at least one of hydrogen sulfide and mercaptans may be abated by adding to the polluted stream a chelate of a polyvalent metal with a substance selected from the class consisting of acetyl acetone, cyclopentadiene, ethylene diamine tetra-acetic acid, N-hydroxyethyl ethylene diamine triacetic acid, gluconic acid, tartaric acid and citric acid in an amount that is stoichiometrically substantially less than the amount of the pollutant, and contacting with gaseous oxygen the polluted stream containing the chelate. In a preferred form, the gaseous oxygen is present as a component of atmospheric air. Preferably, the oxygen is present in an amount at least about twice the stoichiometric quantity of the pollutant, more preferably at least about four times the quantity.

The polyvalent metals include all polyvalent metals. Among these, the most commercially attractive are chromium, cobalt, copper, iron, lead, manganese, mercury, molybdenum, nickel, palladium, platinum, tin, titanium, tungsten and vanadium. Iron, cobalt and nickel are preferred, and iron particularly is preferred.

Among the organic components of the chelate, N-hydroxyethyl ethylene diamine triacetate is particularly preferred, and its chelate with iron is the most preferred chelate.

Pressure is not critical. The reaction proceeds at atmospheric pressure as well as at other pressures normally encountered in the industrial processes in question.

Similarly, temperature is not critical. The reaction proceeds at least within the range −50° Fahrenheit to 400° Fahrenheit, and evidently also outside this temperature range. Accordingly, room temperature or the outside temperatures encountered at any season of the year are quite suitable for the practice of the process.

Similarly, concentration of the pollutant is not critical. The process of the present invention is capable of reducing or substantially destroying concentrations of hydrogen sulfide and/or mercaptans in excess of about 100,000 parts per million (p.p.m.) and at the other extreme, in concentrations even below 1 p.p.m.

Within normal ranges, pH is not critical. Operation within the pH range of 4 to 11 is feasible.

During the reaction, the pollutant is oxidized by the oxygen present, and the chelate catalyzes the reaction. In view of its nature as a catalyst, therefore, the concentration of the chelate is also not critical.

The catalyst of the present invention is preferably added to the polluted stream in liquid phase, in solution in a suitable carrier which preferably is either water or an organic liquid miscible with water, such as ethanol, methanol or the like.

To enable persons skilled in this art to practice the invention, the following illustrative eaxmples are given:

*Example 1*

To prepare a catalyst suitable for use in the present invention, 28 parts of cobaltic chloride are dissolved in 50 parts of water and 135 parts of a 45% solution of tetrasodium ethylene diamine tetra-acetate are added with stirring. The resultant product is filtered and filtrate is reserved for use as the catalyst.

*Example 2*

Another catalyst is prepared by dissolving 10 parts of ferric acetylacetonate in 90 parts of 95% ethanol, and the product is filtered for use as a catalyst.

*Example 3*

Five parts of commercial dicyclopentadienyl iron are dissolved in 95 parts of methanol and reserved for use as a catalyst.

*Example 4*

To 53 parts of 45% ferric chloride solution are added 150 parts of 40% aqueous solution trisodium N-hydroxyethyl ethylene diamine triacetate with stirring. The pH is adjusted to 7.0 with 20% caustic soda solution and the new product is filtered for use as a catalyst.

*Example 5*

Thirty parts of nickel sulfate are dissolved in 70 parts of water and 105 parts of a 45% solution of tetrasodium ethylene diamine tetra-acetate are added with stirring and the resulting solution is reserved for use as a catalyst.

*Example 6*

Seventeen parts of cupric chloride dihydrate are dissolved in 50 parts of water and 40 parts of 50% gluconic acid are added with stirring. Five percent ammonium hydroxide is added until a pH of 6 is reached. The resultant solution is reserved for use as a catalyst.

*Example 7*

Still another catalyst solution is prepared by dissolving 45 parts of chromium tribromide in 100 parts of water and 105 parts of a 45% solution of tetrasodium ethylene diamine tetra-acetate are added with stirring.

*Example 8*

Twenty-seven parts of ferric chloride hexahydrate in 15 parts of water are added to 30 parts of tartaric acid dissolved in 65 parts of water. The pH is adjusted to 7.5 with 20% caustic soda, and the resultant solution is reserved for use as a catalyst.

*Example 9*

A further catalyst is prepared by adding 27 parts of ferric chloride hexahydrate in 15 parts of water to 40 parts of citric acid dissolved in 65 parts of water, with adjustment of the pH to 7.5 with 20% caustic soda.

*Example 10*

Forty-five parts of lead acetate trihydrate are dissolved in 130 parts of water and 105 parts of a 45% solution of tetrasodium ethylene diamine tetra-acetate are added with stirring. The pH is adjusted to 6 with acetic acid and the resultant solution reserved for use as a catalyst.

*Example 11*

The nickel sulfate and water of Example 5 are replaced with 25 parts of manganous chloride tetrahydrate in 40 parts of water.

*Example 12*

The nickel sulfate and water of Example 5 are replaced with 28 parts of palladium sulfate in 80 parts of water.

*Example 13*

The nickel sulfate and water of Example 5 are replaced with 55 parts of platinic chloride octahydrate in 150 parts of water.

*Example 14*

The nickel sulfate and water of Example 5 are replaced with 65 parts of titanium tetraiodide in 200 parts of water.

*Example 15*

The nickel sulfate and water of Example 5 are replaced with 20 parts of vanadium trichloride in 100 parts of water.

*Example 16*

To 30 parts of mercuric acetate in 140 parts of water are added 75 parts of a 41% solution of trisodium N-hydroxyethyl ethylene diamine triacetate and the resulting solution reserved for use as a catalyst.

*Example 17*

The mercuric acetate and water of Example 16 are replaced with 38 parts of molybdenum tetrabromide in 80 parts of water.

*Example 18*

The mercuric acetate and water of Example 16 are replaced with 34 parts of stannic sulfate dihydrate in 110 parts of water.

*Example 19*

Forty-eight parts of tungsten iodide are slowly added to 105 parts of a 45% solution of tetrasodium ethylene diamine tetra-acetate with stirring, and the resulting solution reserved for use as catalyst.

*Example 20*

To illustrate the use of catalyst according to the present invention and prepared as in the foregoing examples, a sample of sewage disposal plant liquid effluent containing 20 to 50 p.p.m. of hydrogen sulfide is treated by adding 1 p.p.m. of the catalyst of Example 4 and shaken gently in the presence of air. Within ten minutes, the hydrogen sulfide content drops to less than 1 p.p.m. Similar results are obtained by the use of the other catalysts as prepared above.

*Example 21*

Crude sulfate turpentine containing high concentrations of lower alkyl mercaptans is scrubbed with a 25% aqueous solution of the catalyst of Example 1 with a stream of air bubbling through the mixture. After 10 minutes the catalyst is washed out, the turpentine is dried over sodium sulfate and the treated material is evaluated against the untreated crude turpentine for odor and is found to be much superior in odor. Similar results are obtained by the use of the other catalysts of the foregoing examples.

*Example 22*

One part of mercaptoethanol and 0.1 part of the catalyst of Example 2 in 20 parts of water are shaken in a large sealed flask containing air for a period of twenty minutes. Iodimetric analysis and odor evaluation show a steadily decreasing mercaptoethanol concentration with time. Similar results are obtained by the use of the other catalysts of the foregoing examples.

*Example 23*

A solution of the catalyst of Example 4, equivalent to the quantity required to produce 0.4 gram of sulfur, is diluted to 5% in water in a 2-liter, 3-neck flask. Hydrogen sulfide and air are introduced separately below the surface of the catalyst solution. Air is run in at four times the rate of hydrogen sulfide. Reaction is continued for several hours. The mass is filtered, washed and dried, yielding 8.0 grams (or twenty times the theoretical) sulfur. The filtrate is treated further with hydrogen sulfide and air and continues to produce sulfur and thus destroy hydrogen sulfide. The example is continued until 150 times the theoretical sulfur is produced. Even then, the catalyst remains active. Comparable results are produced by the use of the other catalysts disclosed in the foregoing examples.

*Example 24*

A chemical process unit emitting a stack effluent containing hydrogen sulfide (1400 p.p.m. at the top of the stack) is sprayed with a dilute solution of the catalyst of Example 5 at a rate of 140 p.p.m. Air is introduced at the rate of 20%. The resultant hydrogen sulfide effluent assays only 300 p.p.m. at the top of the stack. Similar results are obtained by the use of the other catalysts described above.

*Example 25*

A 60% solution of the catalyst of Example 8 is sprayed into the vent system from the digester blow-down and the black liquor recovery of a Kraft pulp mill. The catalyst solution or mist begins to react immediately with the reduced sulfur compounds of the effluent and continues to react in the stack and in the atmosphere. Organic sulfur malodors which have previously been detectable over wide radii are so reduced in concentration that they are no longer detectable or detectable only at radii which are fractional parts of the previous range. Similar results are obtained by the use of the other catalysts discussed above.

In view of the above disclosure and examples, it will therefore be understood that the term "fluid" as used in this application includes both liquid phase and vapor phase fluids, and that the operation and effectiveness of the invention are essentially the same whether the catalyst is added to a liquid stream which is discharged from an industrial operation or a vapor stream which is vented to the atmosphere.

In view of the foregoing disclosure, therefore, it will be obvious that all of the initially recited objects of the present invention have been achieved.

Although the present invention has been described and exemplified in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A method of abating the pollution of a fluid stream wherein the pollutant is at least one member of the group of hydrogen sulfide and mercaptans, comprising adding to said polluted stream a chelate of a polyvalent metal with a substance selected from the group consisting of acetyl acetone, cyclopentadiene, ethylene diamine tetracetic acid, N-hydroxyethyl ethylene diamine, triacetic acid, gluconic acid, tartaric acid, and citric acid, the proportion by weight of said chelate of the polyvalent metal to said pollutant being in the ratio between 1:20 and 1:150, and simultaneously contacting said polluted stream with oxygen in amount in excess of said pollutant.

2. A method as claimed in claim 1, in which the gaseous oxygen is present as a component of atmospheric air.

3. A method as claimed in claim 1, in which said substance is acetyl acetone.

4. A method as claimed in claim 1, in which said substance is cyclopentadiene.

5. A method as claimed in claim 1, in which said substance is ethylene diamine tetra-acetic acid.

6. A method as claimed in claim 1, in which said substance is N-hydroxyethyl ethylene diamine triacetic acid.

7. A method as claimed in claim 1, in which said substance is gluconic acid.

8. A method as claimed in claim 1, in which said substance is tartaric acid.

9. A method as claimed in claim 1, in which said substance is citric acid.

10. The method according to claim 1 wherein said fluid stream is in the liquid phase.

11. The method according to claim 1 wherein said fluid stream is a gaseous stream.

References Cited by the Examiner

UNITED STATES PATENTS

| | | | |
|---|---|---|---|
| 2,641,571 | 6/1953 | Leutz | 208—240 |
| 3,068,065 | 12/1962 | Hartley et al. | 23—2 |
| 3,071,433 | 1/1963 | Dunn | 23—2 |
| 3,080,315 | 3/1963 | Silvey | 210—62 |
| 3,097,925 | 7/1963 | Pitts et al. | 23—3 X |

FOREIGN PATENTS

| | | |
|---|---|---|
| 550,073 | 8/1956 | Belgium. |
| 901,554 | 7/1962 | Great Britain. |

OTHER REFERENCES

Organic Sequestering Agents, Chaberek et al., 1959, John Wiley and Sons, New York, pp. 151 and 307 relied on.

Summer, Odour Control With Ultra-Violet Radiation, Manufacturing Chemist, March 1953, pp. 105–110, page 105 particularly relied on.

Water Treatment for Industrial and Other Uses, Nordell, 1951, Reinhold Publishing Corp., New York, pp. 100–107, 130 and 131 relied on.

MORRIS O. WOLK, *Primary Examiner.*

M. E. ROGERS, *Assistant Examiner.*